United States Patent [19]
Towata et al.

[11] Patent Number: 6,054,094
[45] Date of Patent: Apr. 25, 2000

[54] METHOD FOR MANUFACTURE COMPOSITE FIBER

[75] Inventors: Atsuya Towata; Mutsuo Sando, both of Aichi; Koichi Niihara, Osaka, all of Japan

[73] Assignees: Japan as represented by Director General of Agency of Industrial Science and Technology; Fine Ceramics Research Association, both of Tokyo, Japan

[21] Appl. No.: 08/995,978

[22] Filed: Dec. 22, 1997

[30] Foreign Application Priority Data

Dec. 28, 1996 [JP] Japan .................................. 8-358112

[51] Int. Cl.$^7$ ...................................... B28B 3/20
[52] U.S. Cl. .......................... 264/638; 264/627; 264/639; 264/640
[58] Field of Search .................... 264/627, 638, 264/639, 640

[56] References Cited

U.S. PATENT DOCUMENTS 5,098,623 3/1992 Pompe ..................................... 264/627
5,705,122 1/1998 Curran ..................................... 264/627

OTHER PUBLICATIONS

Theodore F. Cooke, "Inorganic Fibers—A Literature Review", J. Am. Ceram. Soc., 74 (12), pp. 2959–2978, 1991.
W. R. Cannon, "Review Creep of ceramics", J. Mat. Sci., 18, pp. 1–50, 1983.
Y. H. Chiou, et al., "The preparation of alumina fibre by sol–gel processing", J. Mat. Sci., 29, pp. 2378–2388, 1994.
T. Yogo, et al., "Synthesis of polycrystalline alumina fibre with aluminium chelate precursor", J. Mat. Sci., 26, pp. 5292–5296, 1991.
R. Manalert, et al., "Sol–gel processing and sintering of yttrium aluminium garnet (YAG) powders", J. Mat. Sci., 31, pp. 3453–3458, 1996.
Yueping Xu, et al., "Characteristics of $Al_2O_3$–SiC Nanocomposite Prepared by Sol–Gel Processing", J. Ceram. Soc. of Japan, 102 (3), pp. 312–314, 1994.

*Primary Examiner*—Christopher A. Fiorilla
*Attorney, Agent, or Firm*—Oblon, Spivak, McClelland, Maier & Neustadt, P.C.

[57] ABSTRACT

A method for the manufacture of a ceramic composite fiber in which a second phase is dispersed within a matrix fiber, wherein the matrix consists of a substance selected from alumina, zirconia, mullite, YAG, silica, magnesia, nitrides, carbides, metals, alloys, and polymers; the second phase consists of a substance selected from zirconia, mullite, YAG, other oxides, and metals; and the composite fiber can be produced by synthesizing a fiber from a precursor solution containing the substance of the matrix, and the second phase starting solution dispersed through the solution, and then heating the fiber.

4 Claims, No Drawings

METHOD FOR MANUFACTURE COMPOSITE FIBER

FIELD OF THE INVENTION

The present invention relates to a composite fiber that can be used at higher temperatures in fields such as aerospace (engines and bodies for spacecraft, supersonic transport machines and the like), energy development (high efficiency gas turbines, atomic power, nuclear fusion reactors), and transport equipment (lightweight and high-strength materials), and to a method for the manufacture thereof.

BACKGROUND OF THE INVENTION

Technical advances in various fields in recent years have been accompanied by increasing demand for heat resistant materials that can be used in high temperature environments, and for lightweight and high-strength materials. In a case of conventional ceramic fibers, with regard to the fibers containing silica added for improving elastic modulus of them at normal temperature, where these are used in high temperature environments, a glass phase forms in the grain boundary area of them, which serves as a starting point for fracture, with the result that high strength of them is not achieved. Systems employing oxides exclusively have the drawback that once they are placed beyond a certain temperature environments, rapid particle growth and particle deformation occur in the systems, resulting a sharp decline in their strength.
(References: T. F. Cooke, J. Am. Ceram. Soc., 74 (12) 2959–78 (1991), W. R. Cannon and T. R. Langdon, J. Mat. Sci., 18 (1983), and so on)

With the foregoing in view, it is an object of the present invention to provide a fiber having reduced matrix particle deformation in high temperature environments which can be used as a heat resistant material, and a method for the manufacture thereof.

SUMMARY OF THE INVENTION

The present invention provides a method for the manufacture of a ceramic composite fiber.

The present invention relates to a method for the manufacture of a composite fiber in which a second phase is dispersed within a matrix fiber, wherein the matrix consists of a substance selected from alumina, zirconia, mullite, YAG, silica, magnesia, nitrides, carbides, metals, alloys, and polymers; the second phase consists of a substance selected from zirconia, mullite, YAG, and other oxides, or from metals; and the composite fiber is produced by synthesizing a fiber from a precursor solution containing the substance of the matrix, and the starting solution which serves as the second phase, dispersed through the matrix solution, and then heating the fiber.

Through the present invention it is possible to reduce a deformation of the matrix particles in high temperature environments and to obtain a ceramic fiber which can be used as a heat resistant material.

DETAILED DESCRIPTION OF THE INVENTION

As a result of painstaking research conducted to achieve the object stated above, the inventors discovered that a composite fiber having a second phase dispersed within the fiber could be created, and that a strength of the fiber in high temperature environments could be improved, and thereby the present invention was perfected.

The first embodiment of the present invention for solving the aforementioned problems is a method for the manufacture of a composite fiber in which a second phase is dispersed within a matrix fiber; wherein the matrix consists of a substance selected from alumina, zirconia, mullite, YAG, silica, magnesia, nitrides, carbides, metals, alloys, and polymers; the second phase consists of a substance selected from zirconia, mullite, YAG, and other oxides, or from metals; and the composite fiber is produced by synthesizing a fiber from a precursor solution containing the substance of the matrix, and the starting solution which serves as the second phase, dispersed through the matrix solution, and then heating the fiber.

The second embodiment of the present invention is a method for the manufacture of a composite fiber in which a second phase is dispersed within a matrix fiber, wherein the matrix consists of a substance selected from alumina, zirconia, mullite, YAG, silica, magnesia, nitrides, carbides, metals, alloys, and polymers; the second phase consists of a substance selected from zirconia, mullite, YAG, and other oxides, or from nitrides, carbides, and metals; and the composite fiber is produced by synthesizing a fiber through a precursor solution containing the substance of the matrix, and the solid substance which serves as the second phase, evenly dispersed through the matrix solution, and then heating the fiber.

The third embodiment of the present invention is a method for the manufacture of a composite fiber in which a fiber characterized in that a second phase is dispersed within a single fiber and a matrix fiber of the fiber is coated on the surface thereof with a substance selected from zirconia, mullite, YAG, and other oxides, or from nitrides, carbides, metals, and polymers, whereby the surface of the matrix fiber is evenly coated with the second phase, wherein the composite fiber is produced by adding a starting solution containing the coating substance to a solution in which the fiber is dispersed, and reacting it with the fiber on the surface thereof.

To describe in further detail the method for producing a composite fiber comprising a second phase evenly dispersed within a matrix fiber which pertains to the first embodiment of the present invention, the method in question is characterized in that a starting solution which serves as the second phase is mixed with a matrix starting solution to which a stabilizer has been added, an acid such as hydrochloric acid, acetic acid, or nitric acid is added to produce a precursor solution for spinning, a threadline is formed therefrom, and this fiber is heated to manufacture a composite fiber in which the second phase is evenly dispersed.

In this method, mixing in of the second phase substance is conducted prior to fiber formation, and precipitation of the second phase substance produced by reaction of the matrix with the second phase starting material is conducted during sintering.

Examples of the starting material for the matrix used in this method are alumina sources such as aluminum isopropoxide, aluminum ethoxide, aluminum butoxide, and other alkoxides, as well as salts such as aluminum chloride and aluminum nitrate. Other examples are zirconia; mullite; YAG ($Y_3Al_5O_{12}$); silica; magnesia; silicon nitride, titanium nitride, aluminium nitride and other nitrides; and silicon carbide, titanium carbide, zirconium carbide, and other carbides.

Examples of the solution used in this method are ethanol, normal propanol, isopropanol, and butanol. Examples of stabilizers for the alkoxide and so on which are added to this solution are ethyl 3-oxobutanoate, citric acid, diethanolamine, and triethanolamine. Favorable proportions for the stabilizer for the alkoxide are 25 mol %–200 mol %.

Regarding the substance used in this method, where YAG is to be precipitated, examples of the starting material are yttrium isopropoxide and other alkoxides, as well as yttrium chloride and other salts.

The amount of this second phase favorably ranges from 0.1 wt %–40 wt % of the total fiber weight. Below 0.1 wt %, the amount versus total fiber weight is too small to produce the desired effect. Above 40 wt %, the undesirable effects of the second phase in terms of inhibiting densification cannot be ignored. Where zirconia or other oxide is to be precipitated, examples are, for zirconia, zirconium ethoxide, zirconium propoxide, zirconium butoxide, zirconium oxyacetate, zirconium oxychloride, zirconium oxynitrate, and other salts; for mullite, examples of aluminum sources are aluminum isopropoxide, aluminum chloride, aluminum nitrate, and the like, and examples of silicon sources are ethyl silicate, silicon tetrachloride, and other combinations.

The starting materials mentioned above are added and heated to 40–70° C. using a hot plate, mantle heater, or the like. The alcohol and solution formed are gradually removed to prepare a precursor solution, which is then spun. A composite fiber is synthesized by subjecting this fiber to heat treatment at 1300–1600° C.

Next, to describe in a bit more detail the method for producing a composite fiber comprising a second phase evenly dispersed within a matrix fiber which pertains to the second embodiment of the present invention, the method in question is characterized in that a dispersion containing a powder starting material which serves as the second phase is mixed with a matrix starting solution to which a stabilizer has been added, an acid such as hydrochloric acid, acetic acid, or nitric acid is added to produce a precursor spinning solution, a threadline is formed therefrom, and this fiber is heated to manufacture a composite fiber in which the second phase is evenly dispersed.

In this method, mixing in of the second phase substance is conducted prior to fiber formation.

Examples of the starting material for the matrix used in this method are alumina sources such as aluminum isopropoxide, aluminum ethoxide, aluminum butoxide, and other alkoxides, as well as salts such as aluminum chloride and aluminum nitrate. Other examples are zirconia; mullite; YAG ($Y_3Al_5O_{12}$); silica; magnesia; silicon nitride, titanium nitride, aluminium nitride and other nitrides; and silicon carbide, titanium carbide, zirconium carbide, and other carbides.

Examples of the solution used in this method are ethanol, normal propanol, isopropanol, and butanol. Examples of stabilizers for the alkoxide and so on which are added to this solution are ethyl 3-oxobutanoate, citric acid, diethanolamine, and triethanolamine. Favorable proportions for the stabilizer for the alkoxide are 25 mol %–200 mol %.

Examples of the substance used in this method are zirconia, mullite, YAG, and other oxides, as well as nitrides and carbides. The amount of this second phase favorably ranges from 0.1 wt %–40 wt % of the total fiber weight. Where the second phase is to be dispersed, the second phase substance predispersed is mixed in the solution. In the case of silicon carbide, for example, the method of dispersion comprises adding finely divided silicon carbide to a butanol solution, subjecting this to ultrasonic waves, letting it stand overnight, and then collecting the supernatant and mixing it into the solution.

The starting materials mentioned above are dispersed and heated to 40–70° C. The alcohol in the solution is gradually removed to prepare a precursor solution, which is then spun. A composite fiber is synthesized by subjecting this fiber to heat treatment at 1300–1600° C.

Next, to describe in a bit more detail the method for producing a composite fiber comprising a matrix fiber evenly coated on the surface thereof with a second phase which pertains to the third embodiment of the present invention, the method in question is characterized in that a composite fiber is manufactured by a method in which a starting solution containing the substance for coating to which a stabilizer has been added is added to a solution in which the fiber is dispersed, and is reacted with the fiber on the surface thereof to coat the surface.

Examples of the coating starting material used in this method are alumina sources such as aluminum isopropoxide and other alkoxides, as well as salts such as aluminum chloride and aluminum nitrate. Other examples are zirconia; mullite; YAG ($Y_3Al_5O_{12}$); silica; magnesia; silicon nitride, titanium nitride, amyl nitride and other nitrides; and silicon carbide, titanium carbide, zirconium carbide, and other carbides.

Examples of the solution used in this method are benzene, toluene, xylene, and other aromatic hydrocarbons; and kerosene, hexane, and other petroleum fractions. Alcohols which may be added to the solution include ethanol, normal propanol, isopropanol, and butanol. The added amount is preferably 2.5–10 vol % with respect to the hydrophobic organic solvent. Examples of stabilizers for the alkoxide and so on which are added to this solution are ethyl 3-oxobutanoate, citric acid, diethanolamine, and triethanolamine. Favorable proportions for the stabilizer for the alkoxide are 25 mol %–200 mol %.

Favorable examples of the fiber used in this method are one-component fibers with moisture pre-adsorbed onto the fiber surface, and composite fibers in which a second phase of alumina, zirconia, or other oxide, or of silicon carbide, silicon nitride, or the like is evenly dispersed in a matrix of alumina, zirconia, or other oxide, or of a carbide or nitride.

A solution containing water in the stoichiometric equivalent to the added alkoxide preferred. The coating starting material is added in amount of 5 to 15 vol % versus the fiber.

Accordingly, an alumina-coated composite fiber coated with alumina formed through hydrolysis and condensation of the alkoxide is synthesized.

Especially representative examples of the present invention are presented below, but no limitation whatsoever of the present invention is implied by these examples. It was found that the composite fibers prepared in the examples of the present invention possess excellent characteristics as heat resistant materials and are useful as heat resistant materials that can be used in high temperature environments.

EXAMPLE 1

In 10 g alumina isopropoxide placed in 50 mL isopropanol, ethyl 3-oxobutanoate was mixed in an equimolar amount with respect to the alumina isopropoxide, and then yttrium isopropoxide was added in an amount of 1 vol % with respect to the alumina, and the solution was heated at about 80° C. The alcohol fraction which formed in the solution was gradually removed to prepare a precursor solution, which was then spun. The fiber was heat treated at 1400° C., as a result of which a composite fiber containing YAG particles dispersed in an alumina matrix was synthesized.

EXAMPLE 2

In 10 g alumina isopropoxide placed in 50 mL isopropanol, ethyl 3-oxobutanoate was mixed in an equimolar amount with respect to the alumina isopropoxide, and then magnesium isopropoxide was added in an amount of 1 vol % (as magnesia) with respect to the alumina, and the solution was heated at about 80° C. The alcohol fraction which formed in the solution was gradually removed to prepare a precursor solution, which was then spun. The fiber was heat treated at 1400° C., as a result of which a composite fiber containing magnesia particles dispersed in an alumina matrix was synthesized.

EXAMPLE 3

In 10 g zirconium normal butoxide placed in 50 mL isopropanol, ethyl 3-oxobutanoate was mixed in an equimolar amount with respect to the zirconium normal butoxide, and then alumina isopropoxide was added in an amount of 1 vol % (as alumina) with respect to the zirconia, and the solution was heated at about 80° C. The alcohol fraction which formed in the solution was gradually removed to prepare a precursor solution, which was then spun. The fiber was heat treated at 1400° C., as a result of which a composite fiber containing alumina particles dispersed in a zirconia matrix was synthesized.

EXAMPLE 4

In 10 g alumina isopropoxide placed in 50 mL isopropanol, ethyl 3-oxobutanoate was mixed in an equimolar amount with respect to the alumina isopropoxide, and then silicon carbide particles were dispersed in normal butanol in an amount of 1 vol % with respect to the alumina, and the solution was heated at about 80° C. The alcohol fraction in the solution was gradually removed to prepare a precursor solution, which was then spun. The fiber was heat treated at 1400° C., as a result of which a composite fiber containing silicon carbide particles evenly dispersed in an alumina matrix was synthesized.

EXAMPLE 5

In 10 g zirconium normal butoxide placed in 50 mL isopropanol, ethyl 3-oxobutanoate was mixed in an equimolar amount with respect to the zirconium normal butoxide, and then silicon carbide particles were dispersed in normal butanol in an amount of 1 vol % with respect to the zirconia, and the solution was heated at about 80° C. The alcohol fraction in the solution was gradually removed to prepare a precursor solution, which was then spun. The fiber was heat treated at 1400° C., as a result of which a composite fiber containing silicon carbide particles evenly dispersed in a zirconia matrix was synthesized.

EXAMPLE 6

In 10 g alumina isopropoxide placed in 50 mL isopropanol, ethyl 3-oxobutanoate was mixed in an equimolar amount with respect to the alumina isopropoxide, and then nitrogen boride particles were dispersed in normal butanol in an amount of 1 vol % with respect to the alumina, and the solution was heated at about 80° C. The alcohol fraction in the solution was gradually removed to prepare a precursor solution, which was then spun. The fiber was heat treated at 1400° C., as a result of which a composite fiber containing nitrogen boride particles evenly dispersed in an alumina matrix was synthesized.

EXAMPLE 7

To 50 mL hexane containing water in the stoichiometric equivalent of the alkoxide to be added was added alumina isopropoxide in an amount of 0.01 to 10 vol % (as alumina to be formed) with respect to the fiber to be coated, and ethyl 3-oxobutanoate was mixed therein in a 0.5/1–3/1 molar ratio versus the alumina isopropoxide, and then isopropanol was added thereto in an amount of 5 vol % with respect to the hexane, and the solution was stirred. An alumina-coated silicon carbide composite fiber coated with alumina formed through hydrolysis and condensation of the alkoxide was synthesized.

EXAMPLE 8

To 50 mL hexane containing water in the stoichiometric equivalent of the alkoxide to be added was added zirconium normal butoxide in an amount of 0.01 to 10 vol % (as zirconia to be formed) with respect to the fiber to be coated, and ethyl 3-oxobutanoate was mixed therein in a 0.5/1–3/1 molar ratio versus the zirconium normal butoxide, and then isopropanol was added thereto in an amount of 5 vol % with respect to the hexane, and the solution was stirred. A zirconiacoated silicon carbide composite fiber coated with zirconia formed through hydrolysis and condensation of the alkoxide was synthesized.

EXAMPLE 9

To 50 mL benzene containing water in the stoichiometric equivalent of the alkoxide to be added was added aluminum isopropoxide in an amount of 0.01 to 10 vol % (as alumina to be formed) with respect to the fiber to be coated, and ethyl 3-oxobutanoate was mixed therein in a 0.5/1–3/1 molar ratio versus the aluminum isopropoxide, and then isopropanol was added thereto in an amount of 5 vol % with respect to the hexane, and the solution was stirred. An alumina-coated silicon carbide composite fiber coated with alumina formed through hydrolysis and condensation of the alkoxide was synthesized.

EXAMPLE 10

To 50 mL hexane containing water in the stoichiometric equivalent of the alkoxide to be added was added aluminum normal butoxide in an amount of 0.01 to 10 vol % (as zirconia to be formed) with respect to the fiber to be coated, and ethyl 3-oxobutanoate was mixed therein in a 0.5/1–3/1 molar ratio versus the aluminum normal butoxide, and then isopropanol was added thereto in an amount of 5 vol % with respect to the hexane, and the solution was stirred. A alumina-coated silicon carbide composite fiber coated with alumina formed through hydrolysis and condensation of the alkoxide was synthesized.

The method of the present invention reduces deformation of the matrix particles and affords a ceramic fiber that can be used as a heat resistant material.

The composite fiber of the present invention is useful as a composite fiber that can be used at higher temperatures in fields such as aerospace (engines and bodies for spacecraft, supersonic transport machines and the like), energy development (high efficiency gas turbines, atomic power, nuclear fusion reactors), and transport equipment (lightweight and high-strength materials), and the like.

What is claimed is:

1. A method for producing a composite fiber with a second phase dispersed within a matrix fiber having a heat resistant property, wherein the matrix consists of a substance selected from the group consisting of alumina, zirconia, mullite, YAG, silica, magnesia, nitrides, carbides, metals, alloys and polymers, and the second phase consists of a substance selected from the group consisting of zirconia, mullite, YAG, other oxides, and metals, which comprises the following steps:
adding a stabilizer to a matrix starting solution,
mixing the matrix starting solution with a second phase starting solution to form a mixture,
heating the mixture to produce a precursor solution,
synthesizing a fiber from said precursor solution, and then
heating the fiber to obtain a composite fiber with the second phase dispersed within the matrix.

2. The method for producing a composite fiber according to claim 1, wherein the starting materials are heated to 40–70° C. to prepare the precursor solution.

3. The method for producing a composite fiber according to claim 1, wherein the amount of the second phase is 0.1 wt %–40 wt % of the total fiber weight.

4. The method for producing a composite fiber according to claim 1, wherein said heating the fiber is at 1300–1600° C.

* * * * *

UNITED STATES PATENT AND TRADEMARK OFFICE
CERTIFICATE OF CORRECTION

PATENT NO. : 6,054,094
DATED : April 25, 2000
INVENTOR(S) : Atsuya Towata, et al.

It is certified that error appears in the above-identified patent and that said Letters Patent is hereby corrected as shown below:

On the title page, item [54], and at the top of Column 1, the title is incorrectly listed. It should read as follows:

--[54] METHOD FOR MANUFACTURING COMPOSITE FIBER--

Signed and Sealed this

Tenth Day of April, 2001

*Attest:*

NICHOLAS P. GODICI

*Attesting Officer*    *Acting Director of the United States Patent and Trademark Office*